(12) United States Patent
Han

(10) Patent No.: US 12,330,569 B2
(45) Date of Patent: Jun. 17, 2025

(54) STEERING DEVICE OF AUTOMOBILE

(71) Applicant: HL MANDO CORPORATION, Pyeongtaek (KR)

(72) Inventor: Hyun Sik Han, Suwon (KR)

(73) Assignee: HL MANDO CORPORATION, Pyeongtaek (KR)

( * ) Notice: Subject to any disclaimer, the term of this patent is extended or adjusted under 35 U.S.C. 154(b) by 618 days.

(21) Appl. No.: 17/788,943

(22) PCT Filed: Feb. 23, 2021

(86) PCT No.: PCT/KR2021/002242
§ 371 (c)(1),
(2) Date: Jun. 24, 2022

(87) PCT Pub. No.: WO2021/172840
PCT Pub. Date: Sep. 2, 2021

(65) Prior Publication Data
US 2023/0044429 A1 Feb. 9, 2023

(30) Foreign Application Priority Data
Feb. 25, 2020 (KR) .......................... 10-2020-0022656

(51) Int. Cl.
*B60R 16/02* (2006.01)
*B62D 1/16* (2006.01)

(52) U.S. Cl.
CPC ............ *B60R 16/0215* (2013.01); *B62D 1/16* (2013.01); *B60Y 2410/10* (2013.01)

(58) Field of Classification Search
CPC ..... B60R 16/0215; B60R 16/027; B62D 1/16; B60Y 2410/10
See application file for complete search history.

(56) References Cited

U.S. PATENT DOCUMENTS

| 5,088,319 | A | 2/1992 | Hirose | |
|---|---|---|---|---|
| 2013/0140105 | A1* | 6/2013 | Ji | B62D 5/0403 74/30 |
| 2019/0067886 | A1 | 2/2019 | Jung | |

FOREIGN PATENT DOCUMENTS

| CN | 106167039 A | 11/2016 |
|---|---|---|
| CN | 109428241 A | 3/2019 |
| CN | 209833766 U | 12/2019 |
| DE | 10 2014 009 103 A1 | 6/2015 |
| DE | 11 2014 004 756 T5 | 6/2016 |
| JP | 11299058 A | 10/1999 |
| JP | 2006306154 A | 11/2006 |
| JP | 2013187979 A | 9/2013 |
| KR | 20130063231 A | 6/2013 |

(Continued)

OTHER PUBLICATIONS

Office Action issued in Germany Patent Application No. 112021001235.5 dated Apr. 8, 2024.

(Continued)

*Primary Examiner* — Paresh Paghadal
(74) *Attorney, Agent, or Firm* — Harvest IP Law, LLP

(57) ABSTRACT

According to the embodiments, a drilling and tapping process for coupling a wire harness to a sensor cover is eliminated, the number of components for coupling the wire harness to the sensor cover is reduced and the assembly process is simplified, and the wire harness coupled to the sensor cover can be secondarily fixed and prevented from rotating.

11 Claims, 6 Drawing Sheets

(56) References Cited

FOREIGN PATENT DOCUMENTS

| KR | 10-2017-0088175 A | 8/2017 |
| KR | 10-2019-0046570 A | 5/2019 |

OTHER PUBLICATIONS

Office Action issued in Chinese Patent Application No. 202180014002.4 dated Dec. 12, 2023.
Office Action issued in Korean Patent Application No. 10 2020 0022656 dated Apr. 14, 2025.

* cited by examiner

STEERING DEVICE OF AUTOMOBILE

CROSS REFERENCE TO RELATED APPLICATIONS

This application is a National Stage of International Application No. PCT/KR2021/002242 filed on Feb. 23, 2021, claiming priority to Korean Patent Application No. 10-2020-0022656 filed on Feb. 25, 2020, the disclosures of which is incorporated herein by reference in its entirety.

TECHNICAL FIELD

The present embodiments relate to a vehicle steering device and, more specifically, a vehicle steering device that allows it possible to omit the hole and tab machining for coupling the wire harness to the sensor cover, reduce the number of components, simplify assembly, and prevent rotation of the wire harness coupled to the sensor cover while secondarily fixing it.

BACKGROUND ART

A vehicle steering device assists the driver's steering wheel manipulation or wheel steering and, in other words, senses steering information, such as the driver's steering torque or steering angle, and controls the motor based on the sensed steering information.

The sensor for sensing the steering information is connected with the electronic control unit for processing the steering information via an electric wire, is covered by a sensor cover and coupled to the housing. The electric wire is connected to the sensor inside the sensor cover, through a wire harness coupled to the sensor cover.

In the conventional steering device, the wire harness is directly screwed to the sensor cover, and such screwing requires hole and tab machining, rendering processing complicated. Further, as screws and washers are needed for wire harness coupling, the number of components increases, and assembly is tricky.

DETAILED DESCRIPTION OF THE INVENTION

Technical Problem

The present embodiments have been conceived in the foregoing background and aim to omit the hole and tab machining for coupling the wire harness to the sensor cover, reduce the number of components, simplify assembly, and prevent rotation of the wire harness coupled to the sensor cover while secondarily fixing it.

Technical Solution

The present embodiments may provide a steering device of a vehicle, comprising a housing coupled with a steering shaft provided with a sensor for collecting steering information and having a first coupling portion with a first coupling hole, a sensor cover having a coupling opening receiving the sensor and passing through an inner surface and an outer surface and having a second coupling portion with a second coupling hole communicating with the first coupling hole, a wire harness including a cover portion receiving an electric wire connected to the sensor and coupled to the coupling opening and a third coupling portion having an end extending from the cover portion and having a third coupling hole formed in an end thereof to communicate with the second coupling hole, and a coupling member inserted into the first to third coupling holes and coupled to the first to third coupling portions.

Advantageous Effects

According to the present embodiments, it is possible to omit the hole and tab machining for coupling the wire harness to the sensor cover, reduce the number of components, simplify assembly, and prevent rotation of the wire harness coupled to the sensor cover while secondarily fixing it.

MODE FOR CARRYING OUT THE INVENTION

Figure 1:
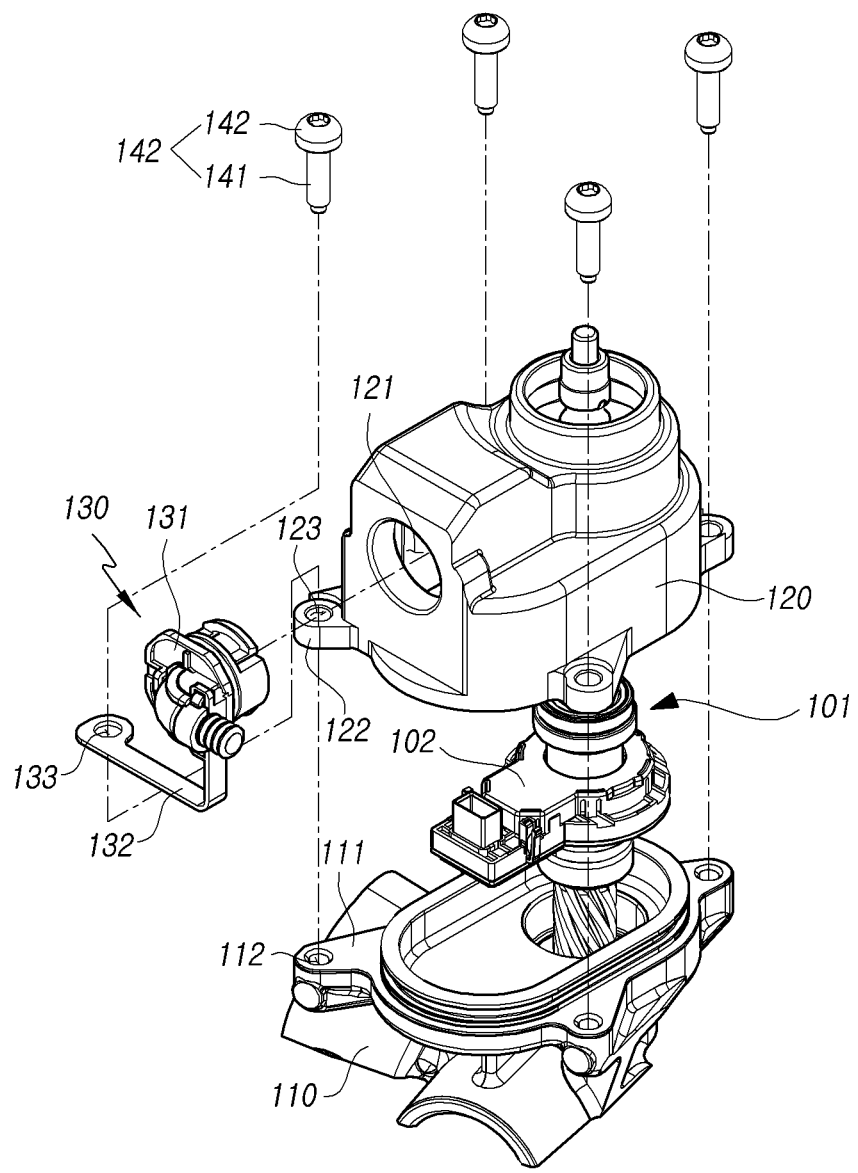
FIG. 1 is an exploded perspective view illustrating a steering column for a vehicle according to the present embodiments.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
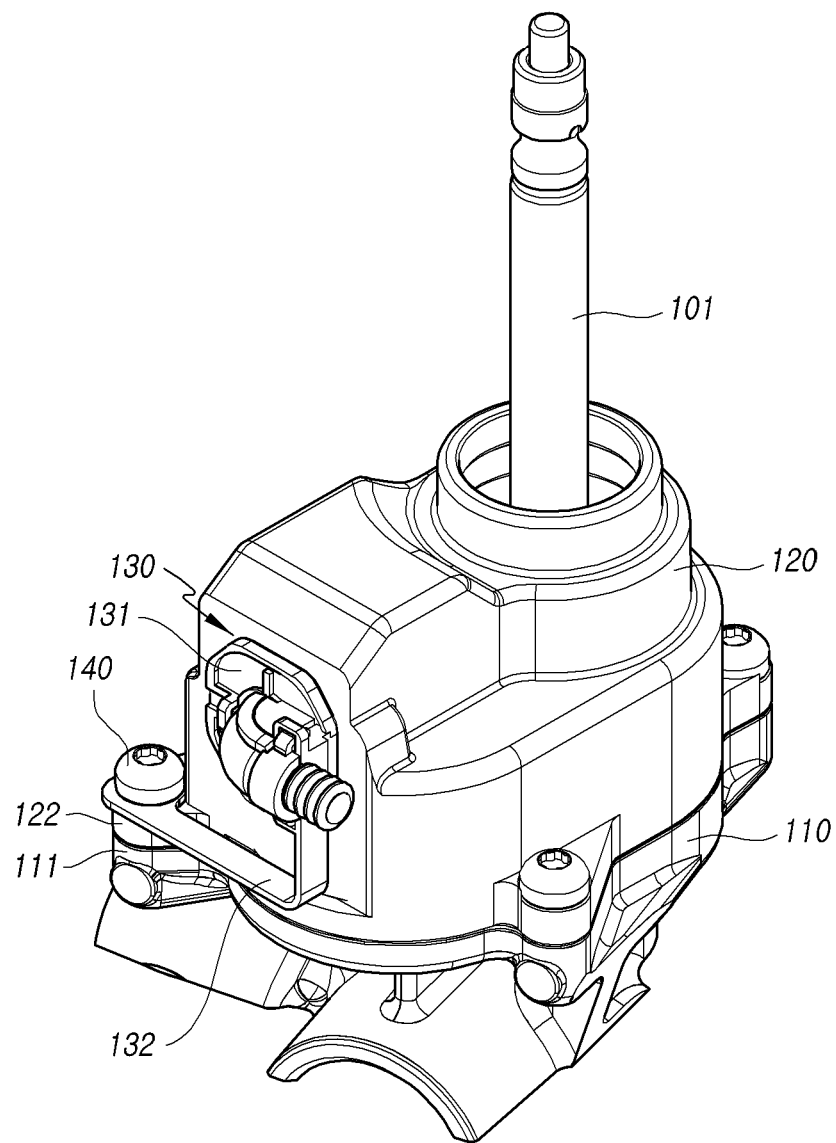
FIG. 2 is a perspective view illustrating an assembled state of FIG. 1.
Figure 3:
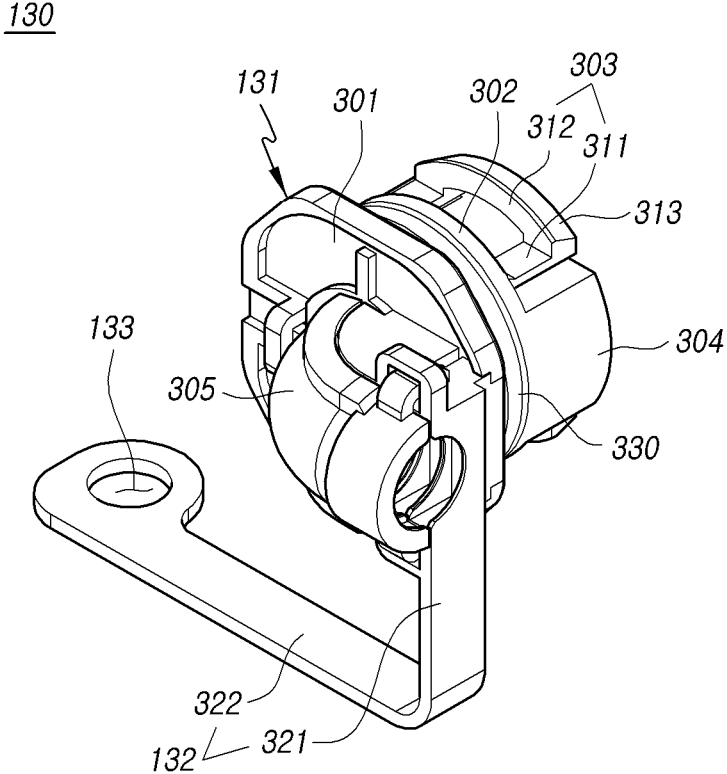
FIGS. 3 and 4 are perspective views illustrating a portion of FIG. 1.
Figure 4:
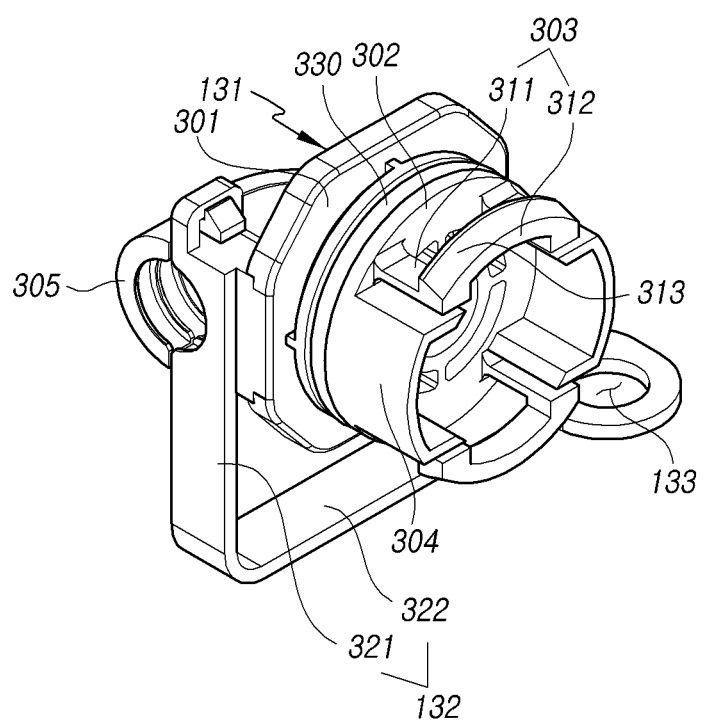
Figure 5:
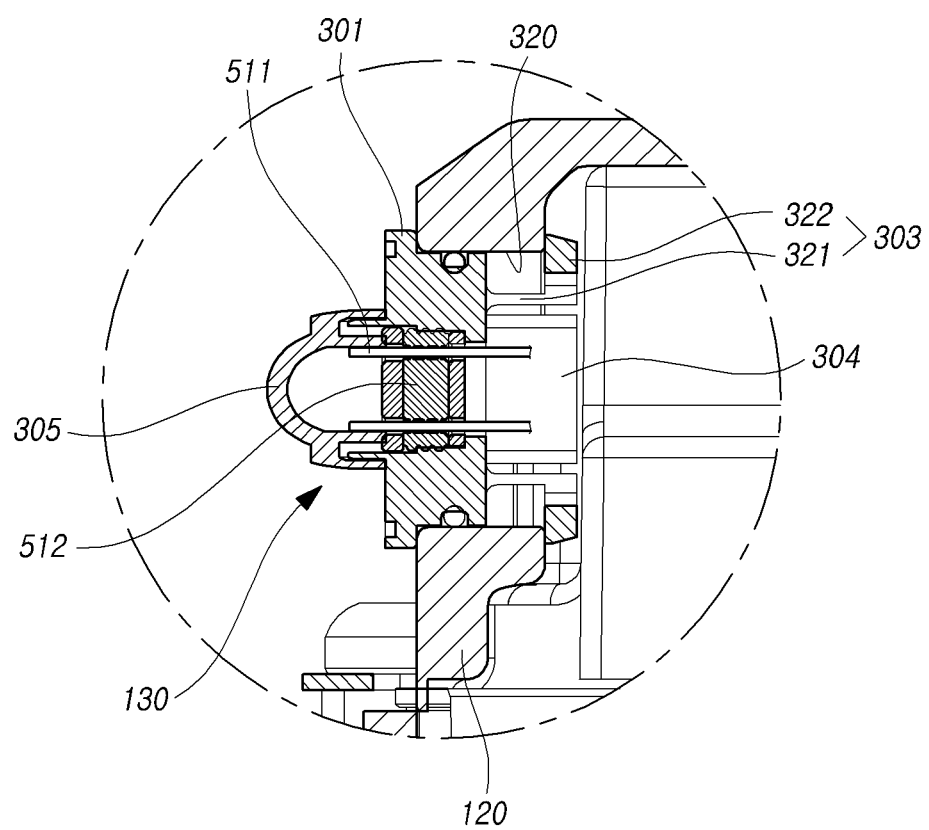
FIG. 5 is a cross-sectional view illustrating part of FIG. 2.
Figure 6:
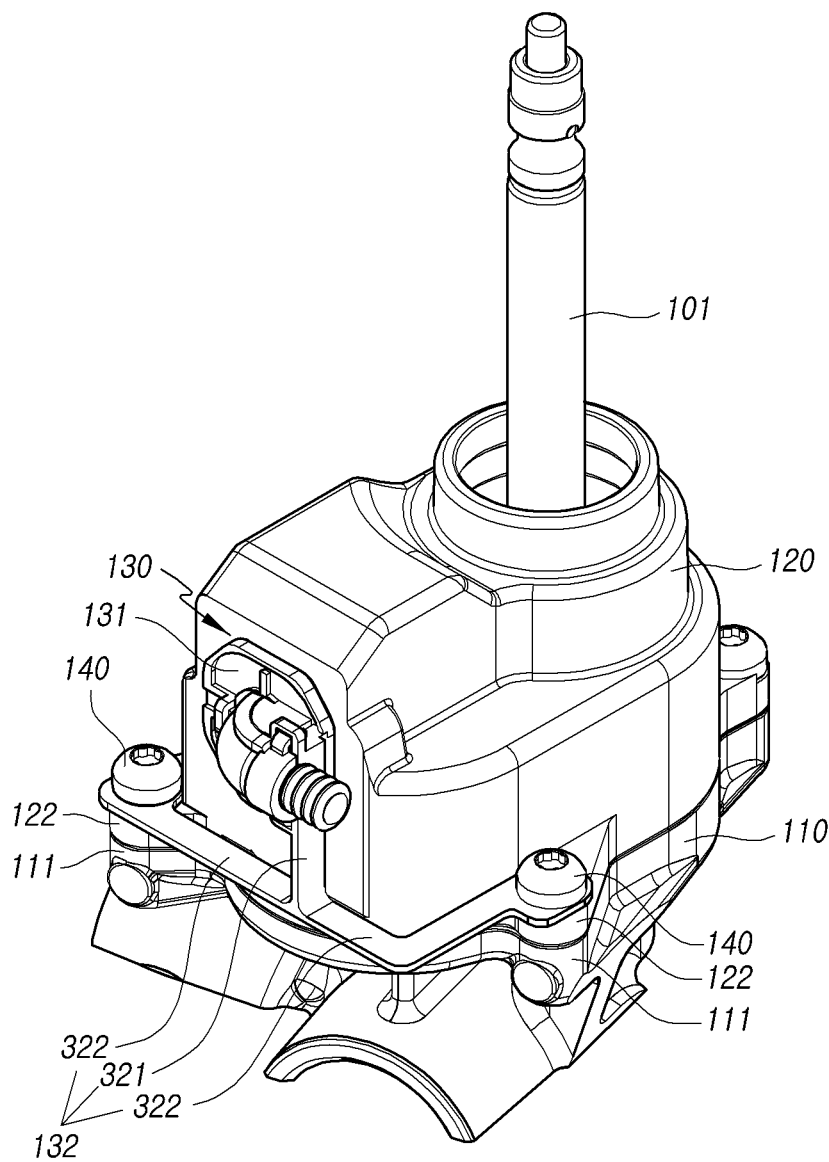
FIG. 6 is a perspective view illustrating a steering device of a vehicle according to the present embodiments.

FIG. 1 is an exploded perspective view illustrating a steering column for a vehicle according to the present embodiments. FIG. 2 is a perspective view illustrating an assembled state of FIG. 1. FIGS. 3 and 4 are perspective views illustrating a portion of FIG. 1. FIG. 5 is a cross-sectional view illustrating part of FIG. 2. FIG. 6 is a perspective view illustrating a steering device of a vehicle according to the present embodiments.

According to the present embodiments, a steering device 100 of a vehicle comprises a housing 110 coupled with a steering shaft 101 provided with a sensor 102 for collecting steering information and having a first coupling portion 111 with a first coupling hole 112, a sensor cover 120 having a coupling opening 121 receiving the sensor 102 and passing through an inner surface and an outer surface and having a second coupling portion 122 with a second coupling hole 123 communicating with the first coupling hole 112, a wire harness 130 including a cover portion 131 receiving an electric wire 511 connected to the sensor 102 and coupled to the coupling opening 121 and a third coupling portion 132 having an end extending from the cover portion 131 and having a third coupling hole 133 formed in an end thereof to communicate with the second coupling hole 123, and a coupling member 140 inserted into the first to third coupling holes 112, 123, and 133 and coupled to the first to third coupling portions 111, 122, and 132.

Referring to FIGS. 1 and 2, the steering shaft 101 is coupled to the housing 110 to support rotation. As the driver manipulates the steering wheel, the steering shaft 101 is rotated and the wheel is steered. The sensor 102 collects steering information, such as the driver's steering torque and steering angle, from the rotation of the steering shaft 101.

In the drawings, only a portion of the housing 110 is shown as a rack housing, and the steering shaft 101 is shown as a partial portion provided with a pinion shaft, but without limitations thereto, a portion of the steering shaft provided with a sensor and a housing supporting the portion may suffice.

The sensor cover 120 has an empty space therein to receive the sensor 102 and is coupled to the housing 110, and is formed in the coupling opening 121 passing through the inner and outer surfaces.

The housing 110 has the first coupling portion 111 with the first coupling hole 112, and the sensor cover 120 has the second coupling portion 122 with the second coupling hole 123. The first coupling portion 111 and the second coupling portion 122 are formed to protrude from the outer surfaces of the housing 110 and the sensor cover 120, respectively, and the first coupling hole 112 and the second coupling hole 123 communicate with each other.

Two or more first coupling portions 111 and second coupling portions 122 may be provided as shown in the drawings and are provided in positions corresponding to each other and coupled by the coupling member 140.

The electronic control unit (not shown) and the sensor 120 are electrically connected with each other via the electric wire 511 inserted through the coupling opening 121, and the wire harness 130 is coupled to the sensor cover 120 while supporting the electric wire 511.

The wire harness 130 includes the cover portion 131 and the third coupling portion 132.

The cover portion 131 has an empty space for receiving the electric wire 511 and is coupled to the coupling opening 121 while supporting the electric wire 511. The third coupling portion 132 extends from the cover portion 131 and has the third coupling hole 133 in an end thereof.

The third coupling hole 133 communicates with the second coupling hole 123. In other words, the third coupling hole 133 communicates with the first coupling hole 112 and the second coupling hole 123.

The coupling member 140 is inserted to the first to third coupling holes 112, 123, and 133 and coupled to the first to third coupling portions 111, 122, and 132 to fix the housing 110, the sensor cover 120, and the wire harness 130.

When two or more first coupling portions 111 and second coupling portions 122 are provided, the third coupling portion 132 may be provided so that the third coupling hole 133 communicates with any one of the first coupling holes 112 and the second coupling holes 123.

It is preferable that the third coupling portion 132 is provided so that the third coupling hole 133 communicates with the first coupling hole 112 and second coupling hole 123 of the first coupling portion 111 and second coupling portion 122 closest to the coupling opening 121.

In other words, the conventional steering device has a structure in which the wire harness is directly screwed to the sensor cover without any configuration corresponding to the third coupling portion according to the present embodiments and thus requires hole and tab machining for screwing, around the coupling opening after forming the sensor cover, resulting in an increase in the number of components necessary for screwing and complicated assembly.

However, according to the present embodiments, the cover portion 131 of the wire harness 130 is simply coupled to the coupling opening 121 by the first support portion 301 and the second support portion 302, and the third coupling portion 132 is coupled to the first coupling portion 111 and second coupling portion 122 by the coupling member 140, so that machining and assembly may be simplified, and the number of components may be reduced.

The third coupling portion 132 may be supported by the second coupling portion 122, on the opposite side of the first coupling portion 111. In other words, the first coupling portion 111, the second coupling portion 122, and the third coupling portion 132 may be stacked in the order thereof.

The third coupling portion 132 may be coupled between the first coupling portion 111 and the second coupling portion 122 by the coupling member 140 but, in such a case, as large a difference in height as the thickness of the third coupling portion 132 is caused between the first coupling portion 111 and second coupling portion 122 coupled with the third coupling portion 132 and the first coupling portion 111 and second coupling portion 122 not coupled with the third coupling portion 132.

The height difference may be compensated by cutting the first coupling portion 111 and second coupling portion 122 by the thickness of the third coupling portion 132, but it is more straightforward to coupling the first coupling portion 111, second coupling portion 122, and third coupling portion 132 in the order.

The coupling member 140 includes a body portion 141 and a head portion 142. The body portion 141 passes through the first to third coupling holes 112, 123, and 133 and couples to the first coupling portion 111, and the head portion 142 is supported by the third coupling portion 132, on the opposite side of the first coupling portion 111.

In other words, as the body portion 141 is coupled to the first coupling portion 111, the second coupling portion 122 and the third coupling portion 132 are fixed between the first coupling portion 111 and the head portion 142.

The body portion 141 may be press-fitted or screwed to the first coupling portion 111.

A description is made below with reference to FIGS. 3 and 5.

The third coupling portion 132 may include a first arm portion 321 extending from the cover portion 131 and a second arm portion 322 bent from the first arm portion 321 and having the third coupling hole 133 in an end thereof.

The first arm portion 321 may be provided to extend from an end of a pipe portion 035 of the cover part 131 described below, but without limitations thereto, it may extend from anywhere of the cover part 131.

The second arm portion 322 is bent from the first arm portion 321 and has the third coupling hole 133 in an end and is coupled with the first coupling portion 111 and the second coupling portion 122 by the coupling member 140.

The drawings illustrate an embodiment in which the first arm portion 321 is formed in a direction perpendicular to the steering shaft 101, and the second arm portion 322 is bent to be formed in the horizontal direction to be easily coupled with the first coupling portion 111 and the second coupling portion 122. However, embodiments of the disclosure are not limited thereto.

The cover part 131 includes a first support portion 301 supported by an outer surface of the sensor cover 120 and a second support portion 302 inserted to the coupling opening 121 and supported by the inner circumferential surface.

The first support portion 301 is formed to have a larger area than the coupling opening 121 (refer to FIG. 1) and supported by the outer surface of the sensor cover 120, and the second support portion 302 is provided on an inner surface of the first support portion 301 and inserted to the coupling opening 121.

The first support portion 301 and the second support portion 302 have a hole communicating with the pipe portion 305, and the hole is penetrated by the electric wire 511 and provided with a supporting member 512 for supporting the electric wire 511.

In other words, the electric wire 511 connects the sensor 102 inside the sensor cover 120 with the electronic control unit outside the sensor cover 120 through the pipe portion 305 and the supporting member 512.

The second support portion 302 is formed in a substantially cylindrical shape to correspond to the shape of the coupling opening 121, and an O ring 330 is provided between the second support portion 302 and the inner circumferential surface of the coupling opening 121 to seal off the coupled portion between the wire harness 130 and the sensor cover 120.

The cover portion 131 may further include a third support portion 303. The third support portion 303 includes an elastic portion 311 extending inward of the sensor cover 120 from the second support portion 302 and a protrusion 312 radially protruding from an end of the elastic portion 311 and supported by the inner surface of the sensor cover 120.

In other words, the protrusion 312 is formed in a substantially arc shape as shown in the drawings and is supported by the inner surface of the sensor cover 120, on the opposite side of the first support portion 301 so that the cover portion 131 is inserted through the coupling opening 121 and is fixed axially of the coupling opening 121.

The elastic portion 311 is provided to connect two opposite ends of the protrusion 312 and the inner surface of the second support portion 302 and is elastically deformed radially inward when the cover portion 131 is inserted to the coupling opening 121 and, after insertion, is then restored radially outward, and the protrusion 312 is supported by the inner surface of the sensor cover 120.

The third support portion 303 is circumferentially spaced apart from the inner surface of the second support portion 302. Two or more third support portions may be provided, and the drawings illustrate an embodiment in which two third support portions 303 are provided to face each other.

The protrusion 312 may have an inclined surface 313 inclined so that the radially protruding height decreases inward of the sensor cover 120. The inclined surface 313 allows the elastic portion 311 to more easily be elastically deformed when the cover portion 131 is inserted to the coupling opening 121.

Further, the cover portion 131 may further include a fourth support portion 304 extending inward of the sensor cover 120 from the inner surface of the second support portion 302 and supported by the inner circumferential surface of the coupling opening 121. The fourth support portion 304 has a curved outer surface to be provided between the second support portions 302.

In other words, as the cover portion 131 is fixed to the coupling opening 121 in the axial direction of the coupling opening 121 by the first support portion 301 and the third support portion 303, and the third coupling portion 132 is coupled to the first coupling portion 111 and the second coupling portion 122 by the coupling member 140, the cover portion 131 is also fixed in the circumferential direction of the coupling opening 121 so that the wire harness 130 may easily be coupled to the sensor cover 120.

Further, according to the conventional steering device, the screw may be loosened to decouple the wire harness due to, e.g., road impact of the vehicle. However, according to the present embodiments, as the wire harness 130 is coupled to the sensor cover 120 secondarily by the third coupling portion 132, as well as by the first support portion 301 and the third support portion 303, the wire harness 130 may be more securely coupled to the sensor cover 120.

Meanwhile, referring to FIG. 6, the third coupling portion 132 may include two or more second arm portions 322.

The drawings illustrate an embodiment in which two second arm portions 322 are formed. The third coupling hole 133 is formed in an end of each second arm portion 322 and, as the second arm portion 322 is coupled to each of different first coupling portions 111 and second coupling portions 122, the wire harness 130 may be more firmly coupled to the sensor cover 120.

By the so-shaped vehicle steering device, it is possible to omit the hole and tab machining for coupling the wire harness to the sensor cover, reduce the number of components, simplify assembly, and prevent rotation of the wire harness coupled to the sensor cover while secondarily fixing it.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

This application claims priority to Korean Patent Application No. 10-2020-0022656 filed in the Korean Intellectual Property Office on Feb. 25, 2020, the disclosure of which is incorporated by reference herein in its entirety.

The invention claimed is:

1. A steering device of a vehicle, comprising:
a housing coupled with a steering shaft provided with a sensor for collecting steering information and having a first coupling portion with a first coupling hole;
a sensor cover having a coupling opening receiving the sensor and passing through an inner surface and an outer surface and having a second coupling portion with a second coupling hole communicating with the first coupling hole;
a wire harness including a cover portion receiving an electric wire connected to the sensor and coupled to the coupling opening and a third coupling portion having an end extending from the cover portion and having a third coupling hole formed in an end thereof to communicate with the second coupling hole; and
a coupling member inserted into the first to third coupling holes and coupled to the first to third coupling portions.

2. The steering device of claim 1, wherein the third coupling portion is supported by the second coupling portion, on an opposite side of the first coupling portion.

3. The steering device of claim 1, wherein the coupling member includes a body portion passing through the first to third coupling holes to couple to the first coupling portion and a head portion supported by the third coupling portion, on an opposite side of the first coupling portion.

4. The steering device of claim 3, wherein the body portion is screwed to the first coupling portion.

5. The steering device of claim 3, wherein the body portion is press-fitted into the first coupling portion.

6. The steering device of claim 1, wherein the third coupling portion includes a first arm portion extending from the cover portion and a second arm portion bent from the first arm portion and having an end with the third coupling hole.

7. The steering device of claim 1, wherein the cover portion includes a first support portion supported by an outer surface of the sensor cover and a second support portion inserted through the coupling opening and supported by an inner circumferential surface.

8. The steering device of claim 7, wherein an O ring is provided between the second support portion and the inner circumferential surface of the coupling opening.

9. The steering device of claim 7, wherein the cover portion further includes a third support portion including an elastic portion extending from the second support portion to an inside of the sensor cover and a protrusion radially protruding from an end of the elastic portion and supported by an inner surface of the sensor cover.

10. The steering device of claim 9, wherein the protrusion has an inclined surface inclined so that a radially protruding height decreases inward of the sensor cover.

11. The steering device of claim 9, wherein the cover portion further includes a fourth support portion extending inward of the sensor cover from an inner surface of the second support portion and supported by the inner circumferential surface of the coupling opening.

* * * * *